United States Patent
Al-Imari (10) Patent No.: US 11,540,312 B2
(45) Date of Patent: Dec. 27, 2022

(54) METHOD AND APPARATUS FOR HANDLING MULTIPLE ACTIVE CONFIGURATIONS OF CONFIGURED GRANT IN MOBILE COMMUNICATIONS

(71) Applicant: MediaTek Singapore Pte. Ltd., Singapore (SG)

(72) Inventor: Mohammed S Aleabe Al-Imari, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 378 days.

(21) Appl. No.: 16/580,217

(22) Filed: Sep. 24, 2019

(65) Prior Publication Data

US 2020/0100279 A1 Mar. 26, 2020

Related U.S. Application Data

(60) Provisional application No. 62/735,915, filed on Sep. 25, 2018.

(51) Int. Cl.
  *H04W 72/14* (2009.01)
  *H04W 80/08* (2009.01)
  (Continued)

(52) U.S. Cl.
  CPC ............ *H04W 72/14* (2013.01); *H04L 5/0092* (2013.01); *H04W 48/16* (2013.01); *H04W 80/08* (2013.01)

(58) Field of Classification Search
  CPC ..... H04L 1/1819; H04L 1/189; H04L 5/0044; H04L 5/0073; H04L 5/0092; H04W 48/16;
  (Continued)

(56) References Cited

U.S. PATENT DOCUMENTS

2015/0036545 A1   2/2015 Lee et al.
2015/0234769 A1   8/2015 Park et al.
(Continued)

FOREIGN PATENT DOCUMENTS

CN   101873713 A   10/2010
CN   107624263 A   1/2018
JP   2020048110 A * 3/2020 ........... H04L 5/0012

OTHER PUBLICATIONS

China National Intellectual Property Administration, International Search Report and Written Opinion for PCT/CN2019/107739, dated Dec. 25, 2019.

(Continued)

*Primary Examiner* — Khaled M Kassim
*Assistant Examiner* — Zhaohui Yang
(74) *Attorney, Agent, or Firm* — Han IP PLLC; Andy M. Han (57) ABSTRACT

Various solutions for handling multiple active configurations of configured grant with respect to user equipment and network apparatus in mobile communications are described. An apparatus may determine whether multiple active configurations of a configured grant corresponding to a bandwidth part of a serving cell are configured. The apparatus may apply a restriction on an initial transmission of a transport block (TB) in an event that the multiple active configurations of the configured grant are configured. The apparatus may perform the initial transmission of the TB according to the restriction.

8 Claims, 4 Drawing Sheets

(51) Int. Cl.
*H04W 48/16* (2009.01)
*H04L 5/00* (2006.01)

(58) Field of Classification Search
CPC ............ H04W 72/0446; H04W 72/14; H04W 74/0833; H04W 80/08
See application file for complete search history.

(56) References Cited

U.S. PATENT DOCUMENTS

| | | |
|---|---|---|
| 2015/0341874 A1 | 11/2015 | Nguyen-Dang |
| 2016/0119931 A1 | 4/2016 | Soriaga et al. |
| 2018/0006771 A1 | 1/2018 | Huss et al. |
| 2019/0261354 A1* | 8/2019 | Fakoorian ............. H04L 1/1671 |
| 2019/0342910 A1* | 11/2019 | Cao ....................... H04W 72/14 |
| 2021/0051596 A1* | 2/2021 | Lee ....................... H04W 52/48 |
| 2022/0070928 A1* | 3/2022 | Babaei ................ H04W 74/004 |

OTHER PUBLICATIONS

Huawei et al., Enhanced UL configured grant transmissions, 3GPP TSG RAN WG1 Meeting #94, R1-1808100, Gothenburg, Sweden, Aug. 20-24, 2018.
Intel Corporation, Enhancements to configured grant PUSCH, 3GPP TSG RAN WG1 Meeting #94, R1-1808707, Gothenburg, Sweden, Aug. 20-24, 2018.
NTT Docomo, Inc., Summary of 7.2.6.3 Enhanced UL grant-free transmissions, 3GPP TSG RAN WG1 Meeting #94, R1-1809979, Gothenburg, Sweden, Aug. 20-24, 2018.
Taiwan Intellectual Property Office, Office Action for Taiwan Patent Application No. 108134572, dated Sep. 29, 2020.

* cited by examiner

METHOD AND APPARATUS FOR HANDLING MULTIPLE ACTIVE CONFIGURATIONS OF CONFIGURED GRANT IN MOBILE COMMUNICATIONS

CROSS REFERENCE TO RELATED PATENT APPLICATION(S)

The present disclosure is part of a non-provisional application claiming the priority benefit of U.S. Patent Application No. 62/735,915, filed on 25 Sep. 2018, the content of which is incorporated by reference in its entirety.

TECHNICAL FIELD

The present disclosure is generally related to mobile communications and, more particularly, to handling multiple active configurations of configured grant with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), the network node may configure two types of uplink grants for the user equipment (UE) to perform uplink transmissions. The uplink grant may indicate some specific radio resources (e.g., time and frequency resources) for the UE to perform uplink transmission. One type of the uplink grant may comprise the dynamic grant. The dynamic grant may be configured based on the UE's request. For example, the UE may transmit a prior request (e.g., service request (SR), random-access channel (RACH) request or buffer status report (BSR)) to the network. After receiving the request, the network may configure the dynamic grant according to UE's request for the UE to perform uplink data transmission.

The other type of the uplink grant may comprise the configured grant. The configured grant may be configured by the network without UE's request. The uplink transmission based on the configured grant may also be called as a grant-free transmission or a semi persistent scheduling (SPS) transmission. The uplink grant-free transmission or the SPS transmission may be used to address the requirements of several services in wireless communications. For example, it can be used for voice over internet protocol (VoIP) services or ultra-reliable and low latency communications (URLLC) services in Long-Term Evolution (LTE) or NR. The UE may be configured to transmit its uplink data on the configured grant without transmitting a prior request to improve the transmission latency. The network may pre-configure specific radio resources (e.g., time and frequency resources) for the UE to perform the uplink SPS/grant-free/configured grant transmissions.

In order to meet the strict latency requirement for URLLC, flexible start of the uplink configured grant transmission is introduced to reduce latency. On the other hand, in order to reduce the alignment delay in configured grant, multiple active configurations of configured grant for a BWP of a serving cell can be used at the same time. However, enabling the flexible start and the multiple active configurations of configured grant at the same time could create ambiguity at the network regarding which configuration the UE used. The network node would need to perform much blind detection. This will cause a heavy burden on the network node. In addition, as the UE will only transmit part of the K repetitions, having flexible start can jeopardize the reliability when multiple active configured grant configurations is used to reduce the aliment delay.

Accordingly, how to perform uplink configured grant transmissions when the multiple active configurations of configured grant are configured becomes an important issue for some specific service types in the newly developed wireless communication network. Therefore, it is needed to provide proper schemes to handle multiple active configurations of configured grant.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to handling multiple active configurations of configured grant with respect to user equipment and network apparatus in mobile communications.

In one aspect, a method may involve an apparatus determining whether multiple active configurations of a configured grant corresponding to a bandwidth part of a serving cell are configured. The method may also involve the apparatus applying a restriction on an initial transmission of a transport block (TB) in an event that the multiple active configurations of the configured grant are configured. The method may further involve the apparatus performing the initial transmission of the TB according to the restriction.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising determining whether multiple active configurations of a configured grant corresponding to a bandwidth part of a serving cell are configured. The processor may also perform operations comprising applying a restriction on an initial transmission of a TB in an event that the multiple active configurations of the configured grant are configured. The processor may further perform operations comprising performing, via the transceiver, the initial transmission of the TB according to the restriction.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to handling multiple active configurations of configured grant with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, the network node may configure two types of uplink grants for the UE to perform uplink transmissions. The uplink grant may indicate some specific radio resources (e.g., time and frequency resources) for the UE to perform uplink transmission. One type of the uplink grant may comprise the dynamic grant. The dynamic grant may be configured based on the UE's request. For example, the UE may transmit a prior request (e.g., SR, RACH request or BSR) to the network. After receiving the request, the network may configure the dynamic grant according to UE's request for the UE to perform uplink data transmission.

The other type of the uplink grant may comprise the configured grant. The configured grant may be configured by the network without UE's request. The uplink transmission based on the configured grant may also be called as a grant-free transmission or an SPS transmission. The uplink grant-free transmission or the SPS transmission may be used to address the requirements of several services in wireless communications. For example, it can be used for VoIP services or URLLC services in LTE or NR. The UE may be configured to transmit its uplink data on the configured grant without transmitting a prior request to improve the transmission latency. The network may pre-configure specific radio resources (e.g., time and frequency resources) for the UE to perform the uplink SPS/grant-free/configured grant transmissions.

Figure 1:
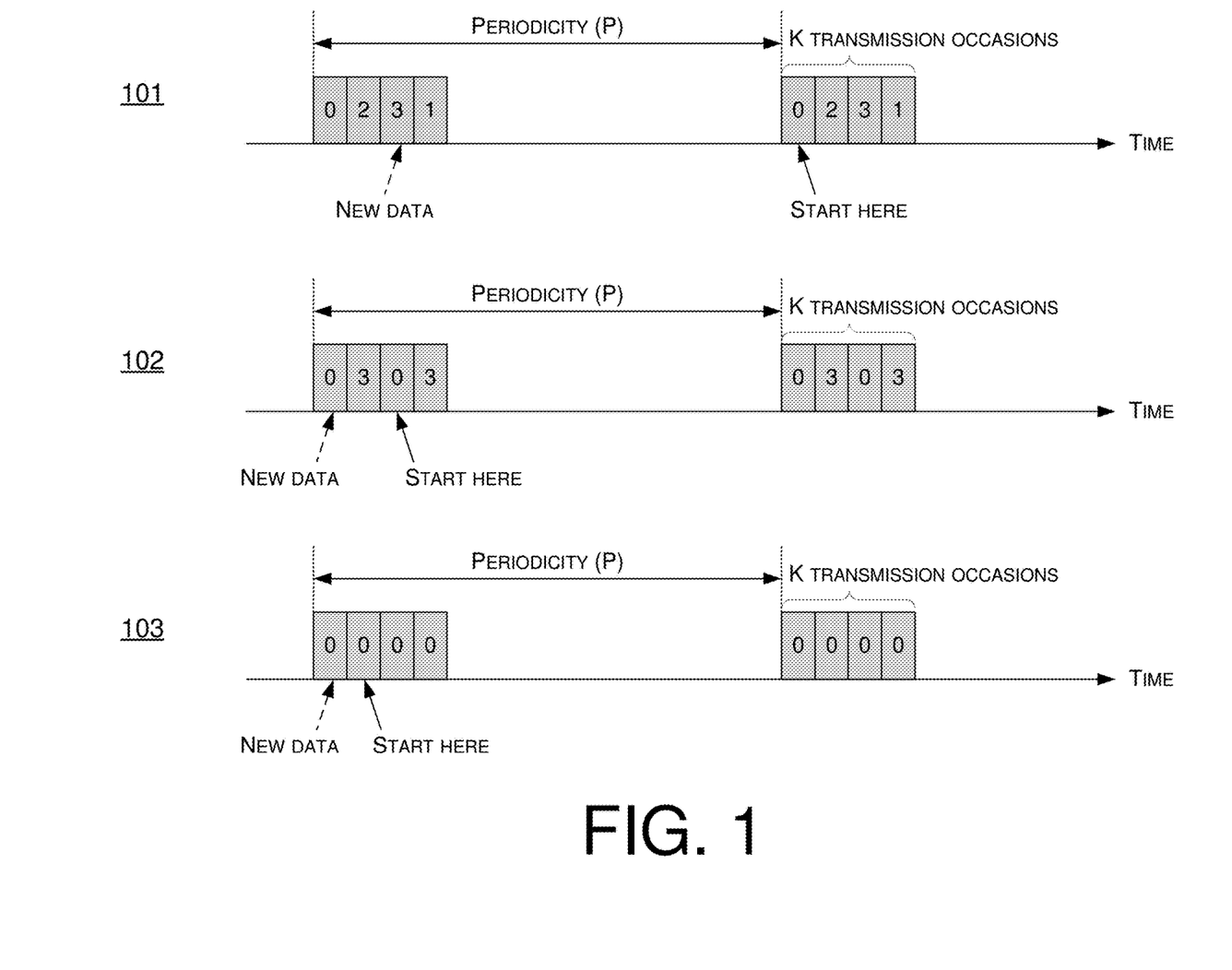
FIG. 1 is a diagram depicting example scenarios under schemes in accordance with implementations of the present disclosure.

In order to meet the strict latency requirement for URLLC, flexible start of the uplink configured grant transmission is introduced to reduce latency. The UE can be configured with one active configuration of configured grant for a BWP of a serving cell. The start of the initial transmission of a TB depends on the configured redundancy version (RV) sequence. The UE may be able to flexibly start the initial transmission of the TB according to the RV sequence. FIG. 1 illustrates example scenarios 101, 102 and 103 under schemes in accordance with implementations of the present disclosure. Scenarios 101, 102 and 103 involve a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured with K transmission occasions (e.g., K repetitions) and an RV sequence for uplink data transmissions. The configured K transmission occasions may be repeated by periodicity P. The value of K may be configured as a positive integer. The value of P may be configured as a time period (e.g., number of symbols). The UE may be configured to start the initial transmission of a TB according to the configured RV sequence and the K repetitions.

In scenarios 101, the UE is configured with RV sequence {0, 2, 3, 1}. When new data arrive at the transmission occasion with RV=3 (e.g., third transmission occasion), the UE will wait for the first transmission occasion in the next period. For RV sequence {0, 2, 3, 1}, the UE may start the transmission at the initial transmission occasion only. For example, in an event that K=8 and RV sequence is {0, 2, 3, 1}, there will be 8 transmission occasions with the following RV pattern {0, 2, 3, 1, 0, 2, 3, 1}. In this example, the UE may start the transmission at the first transmission occasion only. The UE may not start the transmission at the fifth transmission occasion with RV=0. In scenarios 102, the UE is configured with RV sequence {0, 3, 0, 3}. Since the RV sequence is {0, 3, 0, 3}, the UE can start the initial transmission at any of the transmission occasions of the K repetitions that are associated with RV=0 (e.g., third transmission occasion). In scenarios 103, the UE is configured with RV sequence {0, 0, 0, 0}. When new data arrive, the UE can start the initial transmission at any of the transmission occasions of the K repetitions (e.g., second transmission occasion), except the last transmission occasion when K=8.

Figure 2:
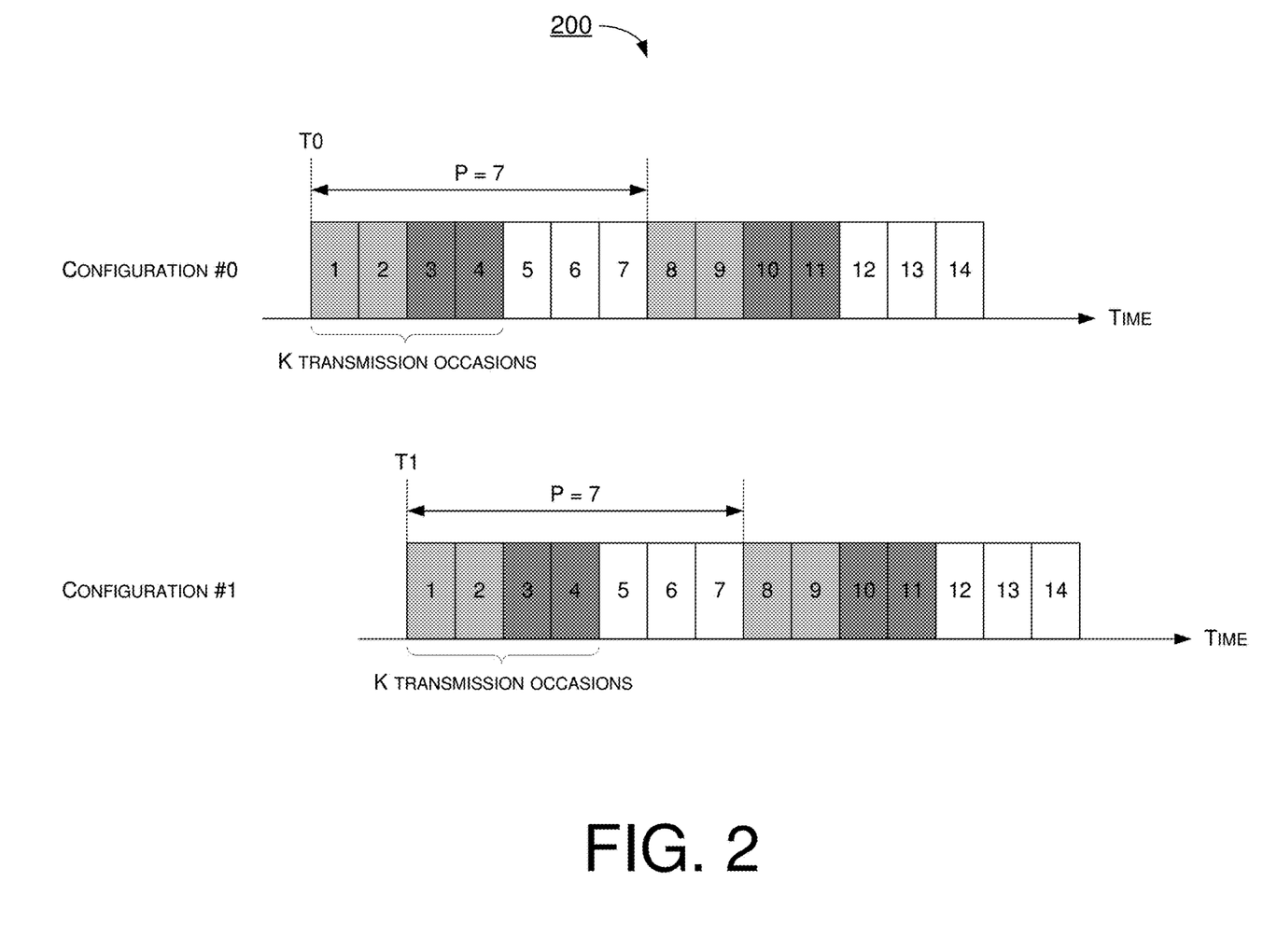
FIG. 2 is a diagram depicting an example scenario under schemes in accordance with implementations of the present disclosure.

On the other hand, in order to reduce the alignment delay in configured grant, multiple active configurations of configured grant for a BWP of a serving cell can be used at the same time. In this way, the UE can select the configuration that has the earliest start. FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured with multiple active configurations of configured grant for a BWP of a serving cell. For example, the UE may be configured with configured grant configuration #0 and configuration #1. To reduce the latency and ensure K repetitions, the start time of the first transmission occasion can be shifted by using different configurations. For example, when new data arrive before T0, the UE may use configuration #0 and start the initial transmission at the first transmission occasion of the K transmission occasions of configuration #0. When new data arrive after T0 and before T1, the UE may use configuration #1 and start the initial transmission at the first transmission occasion of the K transmission occasions of configuration #1.

However, enabling the flexible start and the multiple active configurations of configured grant at the same time could create ambiguity at the network regarding which configuration the UE used. The network node would need to perform much blind detection. This will cause a heavy burden on the network node. In addition, as the UE will only transmit part of the K repetitions, having flexible start can jeopardize the reliability when multiple active configured grant configurations is used to reduce the aliment delay. In view of the above, the present disclosure proposes a number of schemes pertaining to handling multiple active configurations of configured grant with respect to the UE and the network apparatus. According to the schemes of the present disclosure, the flexible start feature may be disabled when the UE is configured with multiple active configurations of configured grant for a BWP of a serving cell. On the other hand, possible RV sequence the UE can be configured with may be restricted when the UE is configured with multiple active configurations of configured grant for a BWP of a serving cell. Furthermore, whether the UE can be configured with K repetitions that cross the periodicity may also be restricted.

Specifically, the UE may be configured to determine whether multiple active configurations of configured grant corresponding to a BWP of a serving cell are configured. The UE may be configured to apply a restriction on an initial transmission of a TB in an event that the multiple active configurations of configured grant are configured. The UE may be configured to perform the initial transmission of the TB according to the restriction. The restriction may comprise starting the initial transmission of the TB at a first transmission occasion of configured repetitions (e.g., K repetitions). For example, the UE may be configured to always start the initial transmission of the TB at the first transmission occasion of K repetitions regardless of a configured RV sequence. In other words, the UE may start the initial transmission of the TB at the first transmission occasion of K repetitions for all the RV sequences. Accordingly, the flexible start of the initial transmission may be disabled when the UE is configured with multiple active configurations of configured grant for a BWP of a serving cell.

Alternatively, the restriction may comprise using an allowed RV sequence to perform the initial transmission of the TB or excluding a specific RV sequence when performing the initial transmission of the TB. Specifically, when the UE is configured with multiple active configurations of configured grant for a BWP of a serving cell, a restriction may be applied on the RV sequence that the UE may be configured with. For example, the UE is not expected to be configured with RV sequence {0, 0, 0, 0} or RV sequence {0, 3, 0, 3} in any of the configurations of configured grant for a BWP of a serving cell. In other words, the UE is not expected to be configured with an RV sequence supporting flexible start of the initial transmission of a TB. The UE may only be configured with an allowed RV sequence (e.g., RV sequence {0, 2, 3, 1}) when the multiple active configurations of configured grant are configured. By applying the restriction on the RV sequence, the UE may be forced to start the initial transmission of a TB at the first transmission occasion of K repetitions.

Alternatively, the restriction may comprise cancelling transmissions of configured repetitions across a periodicity boundary. The UE may be configured to cancel the transmissions of configured repetitions across a periodicity boundary when the multiple active configurations of configured grant are configured. Specifically, whether the UE can be configured with K repetitions that cross a periodicity boundary may base on the number of configurations of configured grant for a BWP of a serving cell. When the UE is configured with a single configuration of configured grant for a BWP of a serving cell, the UE may be allowed to be configured with K repetitions that cross a periodicity boundary. The UE may be configured to transmit K repetitions across a periodicity boundary in an event that the multiple active configurations of configured grant are not configured. When the UE is configured with multiple active configurations of configured grant for a BWP of a serving cell, the UE is not expected to be configured with K repetitions that cross the periodicity boundary. The UE may be configured not to transmit K repetitions across a periodicity boundary in an event that the multiple active configurations of configured grant are configured.

In some implementations, the UE may be configured to apply the restriction to each of the multiple active configurations of configured grant. For each configuration, the initial transmission of a TB should start at the first transmission occasion of the K repetitions for all the RV sequences. In some implementations, the restriction may be applied when the UE is configured with more than one active configuration of configured grant for a BWP of a serving cell. Alternatively, the restriction may be applied when the UE is configured with more than N active configurations of configured-grant for a BWP of a serving cell (e.g. N=2).

In some implementations, the restriction may be applied for a specific type of configured grant (e.g. Type-1 or Type-2) or all types of the configured grant. The UE may be configured to determine whether the multiple active configurations of configured grant comprise a specific type of configured grant. The UE may apply the restriction on the initial transmission of the TB in an event that the multiple active configurations of configured grant comprise the specific type of configured grant.

In some implementations, the restriction may be configured via a high-layer configuration. For example, a radio resource control (RRC) parameter may be used to indicate whether the restriction should be applied or not on the start of the initial transmission of a TB. The restriction may be applied at the UE, the network node, or both sides. The restriction may also be defined in $3^{rd}$ Generation Partnership Project (3GPP) specifications.

Illustrative Implementations

Figure 3:
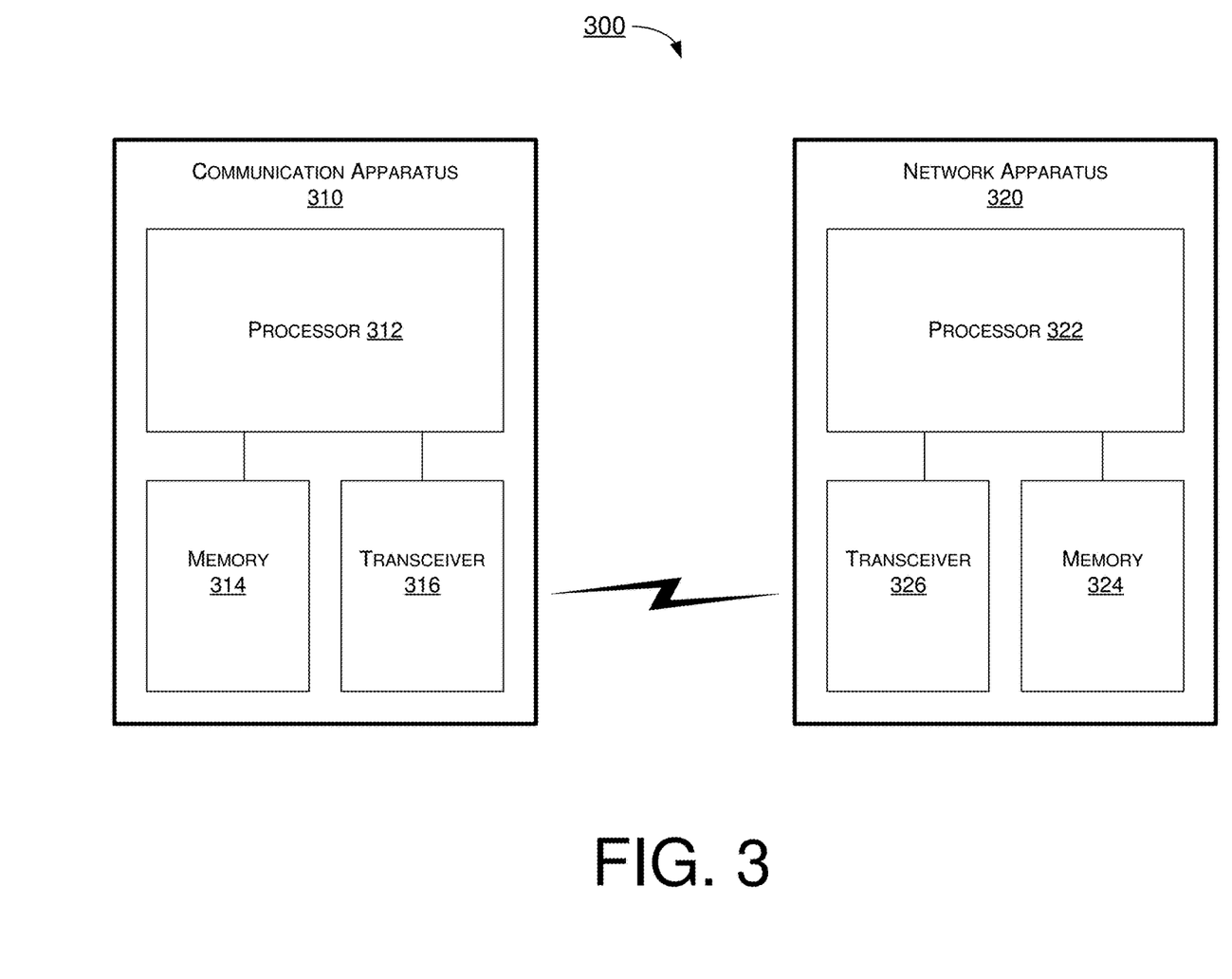
FIG. 3 is a block diagram of an example communication apparatus and an example network apparatus in accordance with an implementation of the present disclosure.
Figure 4:
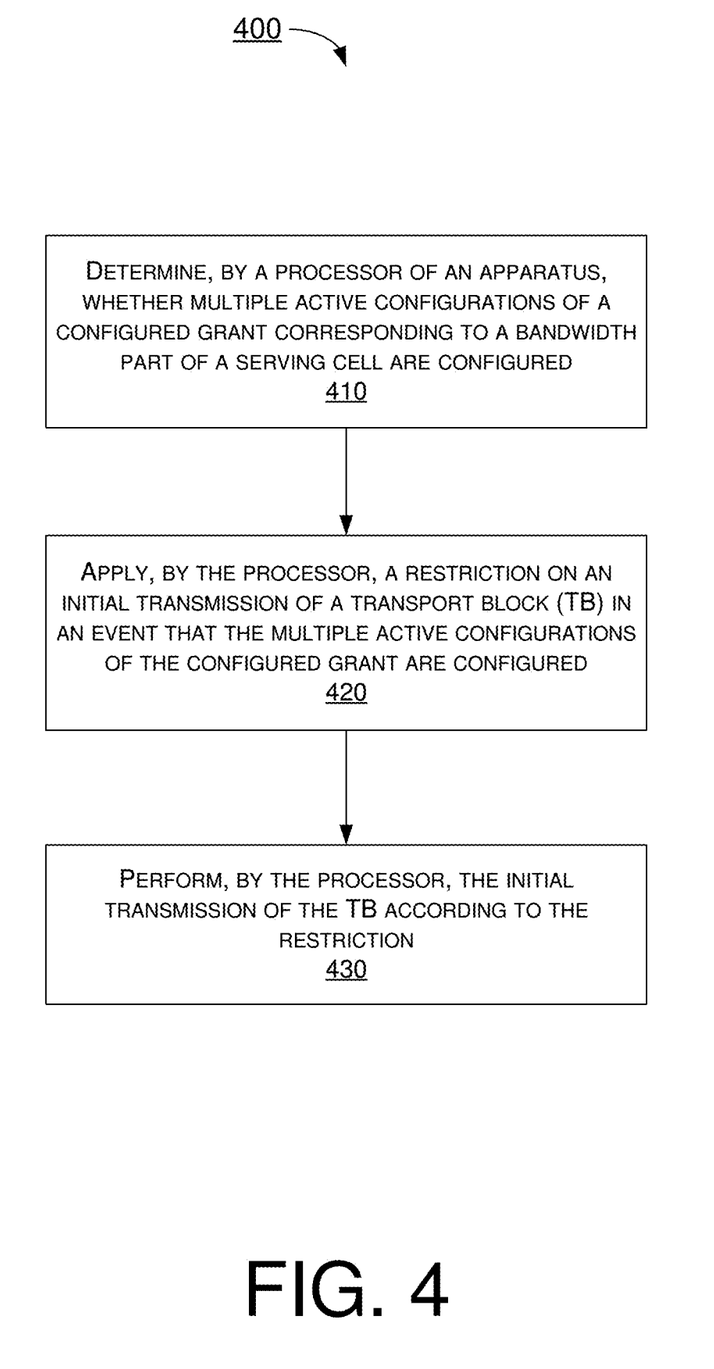
FIG. 4 is a flowchart of an example process in accordance with an implementation of the present disclosure.

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to handling multiple active configurations of configured grant with respect to user equipment and network apparatus in wireless communications, including scenarios/schemes described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example. communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may be configured to determine whether multiple active configurations of configured grant corresponding to a BWP of a serving cell are configured. Processor 312 may be configured to apply a restriction on an initial transmission of a TB in an event that the multiple active configurations of configured grant are configured. Processor 312 may be configured to perform, via transceiver 316, the initial transmission of the TB according to the restriction.

In some implementations, the restriction may comprise starting the initial transmission of the TB at a first transmission occasion of configured repetitions (e.g., K repetitions). For example, processor 312 may be configured to always start the initial transmission of the TB at the first transmission occasion of K repetitions regardless of a configured RV sequence. In other words, processor 312 may start the initial transmission of the TB at the first transmission occasion of K repetitions for all the RV sequences.

In some implementations, the restriction may comprise using an allowed RV sequence to perform the initial transmission of the TB or excluding a specific RV sequence when performing the initial transmission of the TB. Specifically, when processor 312 is configured with multiple active configurations of configured grant for a BWP of a serving cell, a restriction may be applied on the RV sequence that processor 312 may be configured with.

In some implementations, processor 312 is not expected to be configured with RV sequence {0, 0, 0, 0} or RV sequence {0, 3, 0, 3} in any of the configurations of configured grant for a BWP of a serving cell. In other words, processor 312 is not expected to be configured with an RV sequence supporting flexible start of the initial transmission of a TB.

In some implementations, processor 312 may only be configured with an allowed RV sequence (e.g., RV sequence {0, 2, 3, 1}) when the multiple active configurations of configured grant are configured. By applying the restriction on the RV sequence, processor 312 may be forced to start the initial transmission of a TB at the first transmission occasion of K repetitions.

In some implementations, the restriction may comprise cancelling transmissions of configured repetitions across a periodicity boundary. Processor 312 may be configured to cancel the transmissions of configured repetitions across a periodicity boundary when the multiple active configurations of configured grant are configured.

In some implementations, whether processor 312 can be configured with K repetitions that cross a periodicity boundary may base on the number of configurations of configured grant for a BWP of a serving cell. When processor 312 is configured with a single configuration of configured grant for a BWP of a serving cell, processor 312 may be allowed to be configured with K repetitions that cross a periodicity boundary. Processor 312 may be configured to transmit K repetitions across a periodicity boundary in an event that the multiple active configurations of configured grant are not configured.

In some implementations, when processor 312 is configured with multiple active configurations of configured grant for a BWP of a serving cell, processor 312 is not expected to be configured with K repetitions that cross the periodicity boundary. Processor 312 may be configured not to transmit K repetitions across a periodicity boundary in an event that the multiple active configurations of configured grant are configured.

In some implementations, processor 312 may be configured to apply the restriction to each of the multiple active configurations of configured grant. For each configuration, the initial transmission of a TB should start at the first transmission occasion of the K repetitions for all the RV sequences.

In some implementations, the restriction may be applied when processor 312 is configured with more than one active configuration of configured grant for a BWP of a serving cell. Alternatively, the restriction may be applied when processor 312 is configured with more than N active configurations of configured-grant for a BWP of a serving cell (e.g. N=2).

In some implementations, the restriction may be applied for a specific type of configured grant (e.g. Type-1 or Type-2) or all types of the configured grant. Processor 312 may be configured to determine whether the multiple active configurations of configured grant comprise a specific type of configured grant. Processor 312 may apply the restriction on the initial transmission of the TB in an event that the multiple active configurations of configured grant comprise the specific type of configured grant.

Illustrative Processes

FIG. 4 illustrates an example process 400 in accordance with an implementation of the present disclosure. Process 400 may be an example implementation of above scenarios/schemes, whether partially or completely, with respect to handling multiple active configurations of configured grant with the present disclosure. Process 400 may represent an aspect of implementation of features of communication apparatus 310. Process 400 may include one or more operations, actions, or functions as illustrated by one or more of blocks 410, 420 and 430. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 determining whether multiple active configurations of a configured grant corresponding to a bandwidth part of a serving cell are configured. Process 400 may proceed from 410 to 420.

At 420, process 400 may involve processor 312 applying a restriction on an initial transmission of a TB in an event that the multiple active configurations of the configured grant are configured. Process 400 may proceed from 420 to 430.

At 430, process 400 may involve processor 312 performing the initial transmission of the TB according to the restriction In some implementations, the restriction may comprise starting the initial transmission of the TB at a first transmission occasion of configured repetitions.

In some implementations, process 400 may involve processor 312 starting the initial transmission of the TB at the first transmission occasion of the configured repetitions regardless of a configured RV sequence.

In some implementations, process 400 may involve processor 312 applying the restriction to each of the multiple active configurations of the configured grant.

In some implementations, process 400 may involve processor 312 determining whether the multiple active configurations of the configured grant comprise a specific type of configured grant. Process 400 may further involve processor 312 applying the restriction on the initial transmission of the TB in an event that the multiple active configurations of the configured grant comprise the specific type of configured grant.

In some implementations, the restriction may be configured via a high-layer configuration.

In some implementations, the restriction may comprise using an allowed RV sequence to perform the initial transmission of the TB.

In some implementations, the restriction may comprise excluding a specific RV sequence when performing the initial transmission of the TB.

In some implementations, the restriction may comprise cancelling transmissions of configured repetitions across a periodicity boundary.

In some implementations, process 400 may involve processor 312 transmitting configured repetitions across a periodicity boundary in an event that the multiple active configurations of the configured grant are not configured.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus implanted in a user equipment (UE), whether one or more active configurations of a configured grant corresponding to a bandwidth part of a serving cell are configured;
   applying, by the processor, a restriction on an initial transmission of a transport block (TB) in an event that a radio resource control (RRC) parameter enables the applying of the restriction per configured grant configuration and that the one or more active configurations of the configured grant are configured; and
   performing, by the processor, the initial transmission of the TB according to the restriction,
   wherein the restriction is configured via a high-layer configuration,
   wherein the restriction comprises starting the initial transmission of the TB at a first transmission occasion of configured repetitions and not at any other transmission occasion of the configured repetitions, and
   wherein, in an event that the UE is not configured with the restriction, the initial transmission of the TB starts at:
      the first transmission occasion of K repetitions responsive to a configured redundancy version (RV) sequence being {0, 2, 3, 1}, with K being a positive integer;
      any of one or more other transmission occasions of the K repetitions that are associated with RV=0 responsive to the configured RV sequence being {0, 3, 0, 3}; or
      any of the one or more other transmission occasions of the K repetitions responsive to the configured RV sequence being {0, 0, 0, 0}, except a last transmission occasion when K≥8.

2. The method of claim 1, wherein the starting comprises starting the initial transmission of the TB at the first transmission occasion of the configured repetitions regardless of a configured redundancy version (RV) sequence.

3. The method of claim 1, wherein the applying comprises applying the restriction to each of the multiple active configurations of the configured grant.

4. The method of claim 1, wherein the restriction further comprises using an allowed redundancy version (RV) sequence to perform the initial transmission of the TB.

5. An apparatus, comprising:
   a transceiver which, during operation, wirelessly communicates with a network node of a wireless network; and
   a processor communicatively coupled to the transceiver such that, during operation, the processor performs operations comprising:
      determining whether one or more active configurations of a configured grant corresponding to a bandwidth part of a serving cell are configured;
      applying a restriction on an initial transmission of a transport block (TB) in an event that a radio resource control (RRC) parameter enables the applying of the restriction per configured grant configuration and that the one or more active configurations of the configured grant are configured; and performing, via the transceiver, the initial transmission of the TB according to the restriction, wherein the restriction is configured via a high-layer configuration, wherein the restriction comprises starting the initial transmission of the TB at a first transmission occasion of configured repetitions and not at any other transmission occasion of the configured repetitions, and wherein, in an event that the UE is not configured with the restriction, the initial transmission of the TB starts at:

the first transmission occasion of K repetitions responsive to a configured redundancy version (RV) sequence being {0, 2, 3, 1}, with K being a positive integer;

any of one or more other transmission occasions of the K repetitions that are associated with RV=0 responsive to the configured RV sequence being {0, 3, 0, 3}; or any of the one or more other transmission occasions of the K repetitions responsive to the configured RV sequence being {0, 0, 0, 0}, except a last transmission occasion when K≥8.

6. The apparatus of claim 5, wherein, in starting the initial transmission of the TB at the first transmission occasion of configured repetitions, the processor starts the initial transmission of the TB at the first transmission occasion of the configured repetitions regardless of a configured redundancy version (RV) sequence.

7. The apparatus of claim 5, wherein, in applying the restriction on the initial transmission of the TB, the processor applies the restriction to each of the multiple active configurations of the configured grant.

8. The apparatus of claim 5, wherein the restriction further comprises using an allowed redundancy version (RV) sequence to perform the initial transmission of the TB.

\* \* \* \* \*